US012533580B2

(12) United States Patent
Bean et al.

(10) Patent No.: US 12,533,580 B2
(45) Date of Patent: Jan. 27, 2026

(54) USER-CUSTOMIZED FLAT COMPUTER SIMULATION CONTROLLER

(71) Applicant: Sony Interactive Entertainment Inc., Tokyo (JP)

(72) Inventors: Celeste Bean, San Francisco, CA (US); Ellana Fortuna, Austin, TX (US); Yvette Chen, Irvine, CA (US); Alessandra Luizello, San Diego, CA (US); Andrew Perrine, Santa Clarita, CA (US); Jeremy Ambers, San Francisco, CA (US); Elizabeth Osborne, Oakland, CA (US); Marvin Barrera, Palo Alto, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 407 days.

(21) Appl. No.: 18/060,550

(22) Filed: Nov. 30, 2022

(65) Prior Publication Data

US 2024/0173618 A1 May 30, 2024

(51) Int. Cl.
*A63F 13/42* (2014.01)
*A63F 13/22* (2014.01)
*A63F 13/24* (2014.01)

(52) U.S. Cl.
CPC .............. *A63F 13/42* (2014.09); *A63F 13/22* (2014.09); *A63F 13/24* (2014.09)

(58) Field of Classification Search
CPC ........... A63F 13/42; A63F 13/22; A63F 13/24
See application file for complete search history.

(56) References Cited

U.S. PATENT DOCUMENTS

| | | | |
|---|---|---|---|
| 2002/0075275 | A1 | 6/2002 | Togo et al. |
| 2005/0233808 | A1 | 10/2005 | Himoto et al. |
| 2012/0113004 | A1 | 5/2012 | Ohta |
| 2013/0215024 | A1 | 8/2013 | Nakayama et al. |
| 2015/0238855 | A1 | 8/2015 | Uy et al. |
| 2018/0104574 | A1 | 4/2018 | Tager |
| 2020/0301517 | A1 | 9/2020 | Monson et al. |
| 2021/0060424 | A1 | 3/2021 | Buhr et al. |

OTHER PUBLICATIONS

"International Search Report and Written Opinion", dated Mar. 26, 2024, from the counterpart PCT application PCT/US23/078413.

*Primary Examiner* — Yingchuan Zhang
(74) *Attorney, Agent, or Firm* — Fish & Richardson P.C.

(57) ABSTRACT

A parallelepiped-shaped body has a flat top surface on which a user draws computer simulation controller buttons with a layout and spacing best fitting the user's physical needs. The user connects wires in the body to random GPIOs and maps the drawn buttons to desired game controller functions using an off-the-shelf controller connected to an MCU by pressing drawn buttons on the body along with corresponding buttons on the off-the-shelf controller, establishing which drawn button has which game controller function.

14 Claims, 9 Drawing Sheets

USER-CUSTOMIZED FLAT COMPUTER SIMULATION CONTROLLER

FIELD

The present application relates generally to user-customized flat computer simulation controllers.

BACKGROUND

As understood herein, computer simulations such as computer games typically involve use of an off-the-shelf game controller which some people may find difficult to manipulate.

SUMMARY

Accordingly, an apparatus includes a base comprising a top surface and plural button images on the top surface. Each button image is disposed over a respective electrical conductor connected to a general purposes input output (GPIO) port of a least one microcontroller (MCU). The MCU stores correlations between at least some button images and respective functions of a computer simulation controller such that a button when manipulated causes a signal to be generated to the MCU to input a command corresponding to the respective function to at least one computer simulation.

In some examples the base is parallelepiped-shaped. In other examples the base is round or other shape. The electrical conductors can include electrical ink.

In example implementations a first one of the functions corresponding to a first button can include a repeat function selectable to cause a subsequent single manipulation of a second button to be correlated to at least two manipulations of the second button. A first one of the functions corresponding to a first button can include a navigation direction, an analog function, a share function, or an analog stick function. Additional functions are disclosed.

In another aspect, a customized computer simulation controller remapping standard gaming controller control keys includes a substrate on which buttons are formed in a customized layout associated with a specific user. The controller includes at least one processor correlating manipulations of the buttons to functions defined by the standard gaming controller control keys.

If desired, the customized computer simulation controller can include, in addition to the buttons whose functions are defined by the standard gaming controller control keys, at least one anti-fatigue key. In one example, the anti-fatigue key includes a double or repeat key which when manipulated causes a single manipulation of at least a first one of the buttons whose functions are defined by the standard gaming controller control keys to be correlated to two manipulations of the first one of the buttons. In another example, the anti-fatigue key includes a hold key which when manipulated causes a press for a first period of time of at least a first one of the buttons whose functions are defined by the standard gaming controller control keys to be correlated to a press for a second period of time of the first one of the buttons. The second period can be longer than the first period.

In another aspect, a method includes receiving signals generated by hand-drawn buttons on a customized computer simulation controller and controlling at least one computer simulation according to the signals.

The details of the present application, both as to its structure and operation, can be best understood in reference to the accompanying drawings, in which like reference numerals refer to like parts, and in which:

DETAILED DESCRIPTION

Figure 1:
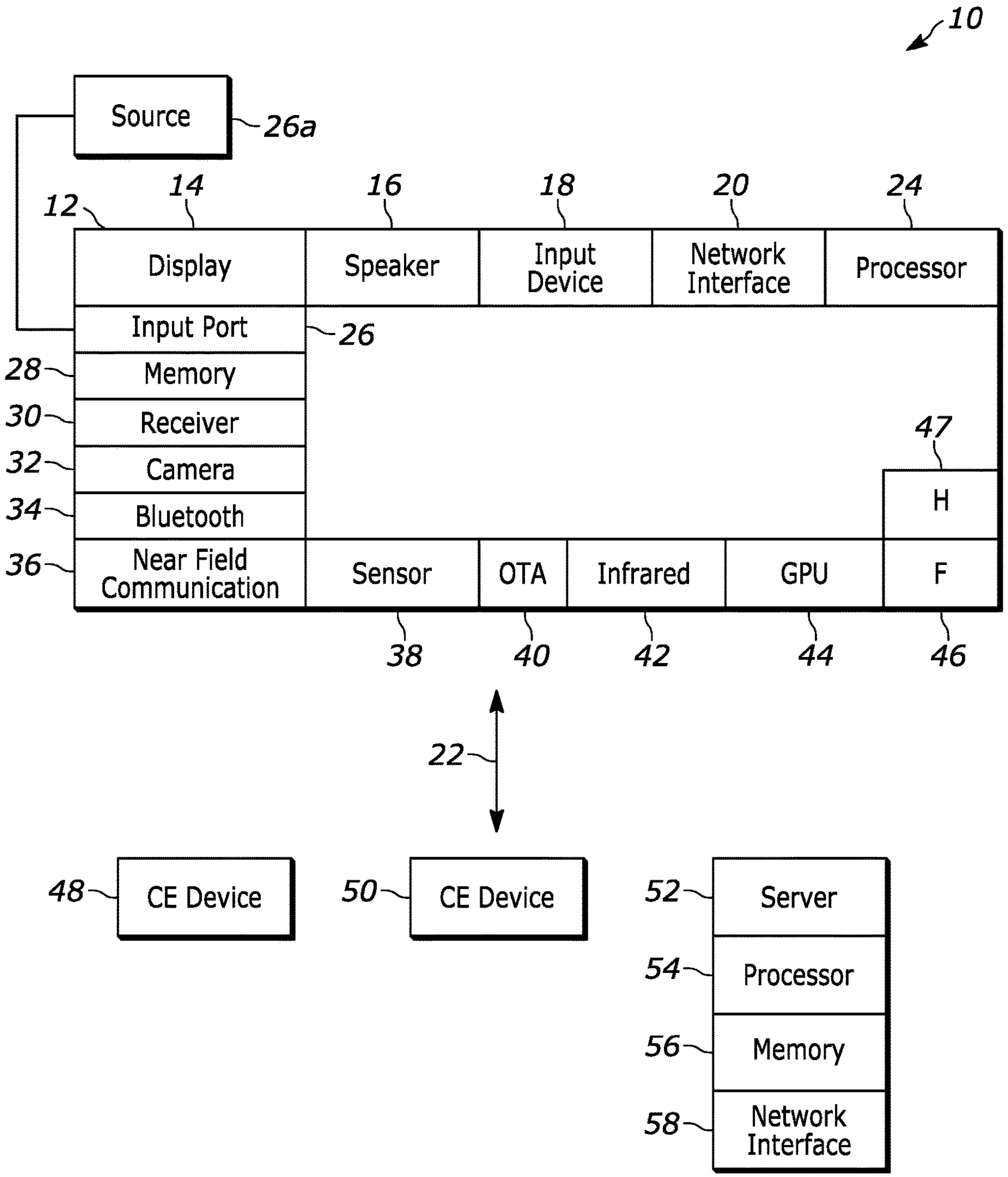
FIG. 1 is a block diagram of an example system in accordance with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, extended reality (XR) headsets such as virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google, or a Berkeley Software Distribution or Berkeley Standard Distribution (BSD) OS including descendants of BSD. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may be used that may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single- or multi-chip processor that can execute logic by means of various lines such as address lines, data lines, and control lines and registers and shift registers. A processor including a digital signal processor (DSP) may be an embodiment of circuitry.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together.

Referring now to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to a theater display system which may be projector-based, or an Internet-enabled TV with a TV tuner (equivalently, set top box controlling a TV). The AVD 12 alternatively may also be a computerized Internet enabled ("smart") telephone, a tablet computer, a notebook computer, a head-mounted device (HMD) and/or headset such as smart glasses or a VR headset, another wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown. For example, the AVD 12 can include one or more touch-enabled displays 14 that may be implemented by a high definition or ultra-high definition "4K" or higher flat screen. The touch-enabled display(s) 14 may include, for example, a capacitive or resistive touch sensing layer with a grid of electrodes for touch sensing consistent with present principles.

The AVD 12 may also include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a universal serial bus (USB) port to physically connect to another CE device and/or a headphone port to connect headphones to the AVD 12 for presentation of audio from the AVD 12 to a user through the headphones. For example, the input port 26 may be connected via wire or wirelessly to a cable or satellite source **26*a* of audio video content. Thus, the source 26*a* may be a separate or integrated set top box, or a satellite receiver. Or the source 26*a* may be a game console or disk player containing content. The source 26*a* when implemented as a game console may include some or all of the components described below in relation to the CE device 48**.

The AVD 12 may further include one or more computer memories/computer-readable storage media 28 such as disk-based or solid-state storage that are not transitory signals, in some cases embodied in the chassis of the AVD as stand-alone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24.

Continuing the description of the AVD 12, in some embodiments the AVD 12 may include one or more cameras 32 that may be a thermal imaging camera, a digital camera such as a webcam, an IR sensor, an event-based sensor, and/or a camera integrated into the AVD 12 and controllable by the processor 24 to gather pictures/images and/or video in accordance with present principles. Also included on the AVD 12 may be a Bluetooth® transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 that provide input to the processor 24. For example, one or more of the auxiliary sensors 38 may include one or more pressure sensors forming a layer of the touch-enabled display 14 itself and may be, without limitation, piezoelectric pressure sensors, capacitive pressure sensors, piezoresistive strain gauges, optical pressure sensors, electromagnetic pressure sensors, etc. Other sensor examples include a pressure sensor, a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command). The sensor 38 thus may be implemented by one or more motion sensors, such as individual accelerometers, gyroscopes, and magnetometers and/or an inertial measurement unit (IMU) that typically includes a combination of accelerometers, gyroscopes, and magnetometers to determine the location and orientation of the AVD 12 in three dimension or by an event-based sensors such as event detection sensors (EDS). An EDS consistent with the present disclosure provides an output that indicates a change in light intensity sensed by at least one pixel of a light sensing array. For example, if the light sensed by a pixel is decreasing, the output of the EDS may be −1; if it is increasing, the output of the EDS may be a +1. No change in light intensity below a certain threshold may be indicated by an output binary signal of 0.

The AVD 12 may also include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics/vibration generators 47 may be provided for generating tactile signals that can be sensed by a person holding or in contact with the device. The haptics generators 47 may thus vibrate all or part of the AVD 12 using an electric motor connected to an off-center and/or off-balanced weight via the motor's rotatable shaft so that the shaft may rotate under control of the motor (which in turn may be controlled by a processor such as the processor 24) to create vibration of various frequencies and/or amplitudes as well as force simulations in various directions.

A light source such as a projector such as an infrared (IR) projector also may be included.

In addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. The HMD may include a heads-up transparent or non-transparent display for respectively presenting AR/MR content or VR content (more generally, extended reality (XR) content). The HMD may be configured as a glasses-type display or as a bulkier VR-type display vended by computer game equipment manufacturers.

In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the aforementioned at least one server 52, it includes at least one server processor 54, at least one tangible computer readable storage medium 56 such as disk-based or solid-state storage, and at least one network interface 58 that, under control of the server processor 54, allows for communication with the other illustrated devices over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown or nearby.

The components shown in the following figures may include some or all components shown in herein. Any user interfaces (UI) described herein may be consolidated and/or expanded, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Support vector machines (SVM) and Bayesian networks also may be considered to be examples of machine learning models. In addition to the types of networks set forth above, models herein may be implemented by classifiers.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that that are configured and weighted to make inferences about an appropriate output.

Figure 2:
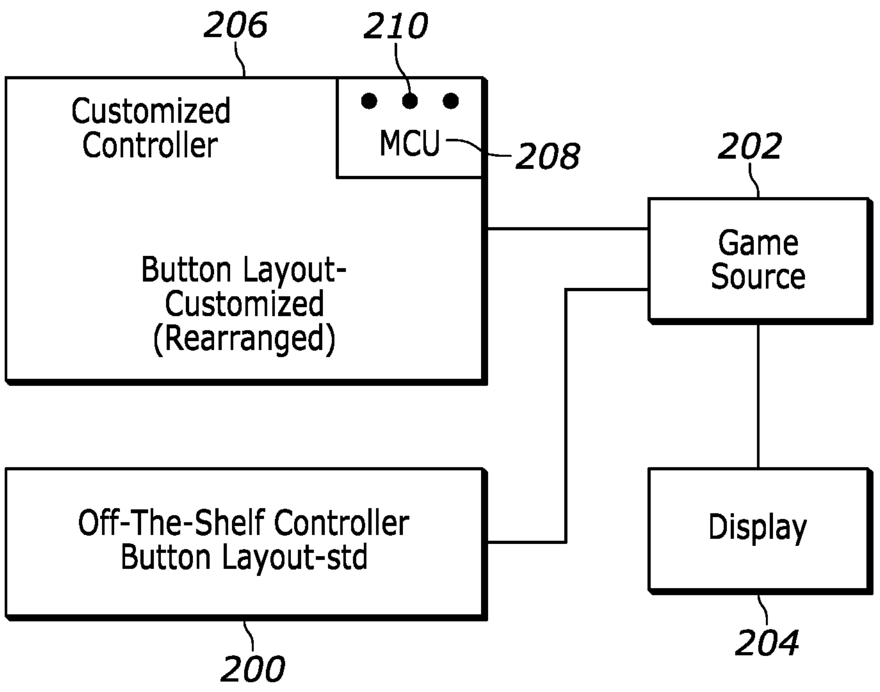
FIG. 2 illustrates an example system with a customized computer simulation controller according to present principles in cooperation with an off-the-shelf controller.

Refer now to FIG. 2. An off-the-shelf computer simulation controller 200 such as a PlayStation® or Xbox® controller can be manipulated by a player to control a computer simulation being executed by a source 202 such as a computer simulation console such as a computer game console or computer game streaming server for presentation of the computer simulation on a display 204 such as a TV, HMD, or other appropriate display. The controller 200 includes plural controls such as buttons that are arranged in a standard layout.

A customized computer simulation controller 206 also is provided with a button layout that is customized for a particular player as set forth further herein. FIG. 2 shows that the customized controller 206 includes one or more microcontrollers (MCU) 208 with plural general-purpose input/output (GPIO) ports 210.

The MCU 208 may include a processor and additional circuitry that implements a variety of peripheral support functions, as well as one or more computer memories. The GPIOs 210 convey both incoming and outgoing digital signals. A GPIO typically is implemented by an electrical connector pin.

Figure 3:
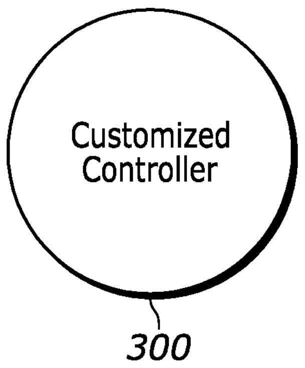
FIG. 3 illustrates an example spherical customized controller.

While FIG. 2 and other figures herein illustrate a customized controller with a parallelepiped-shaped base and buttons on a top flat surface, FIG. 3 illustrates that a customized controller 300 may have other shapes as well, such as spherical.

Figure 4:
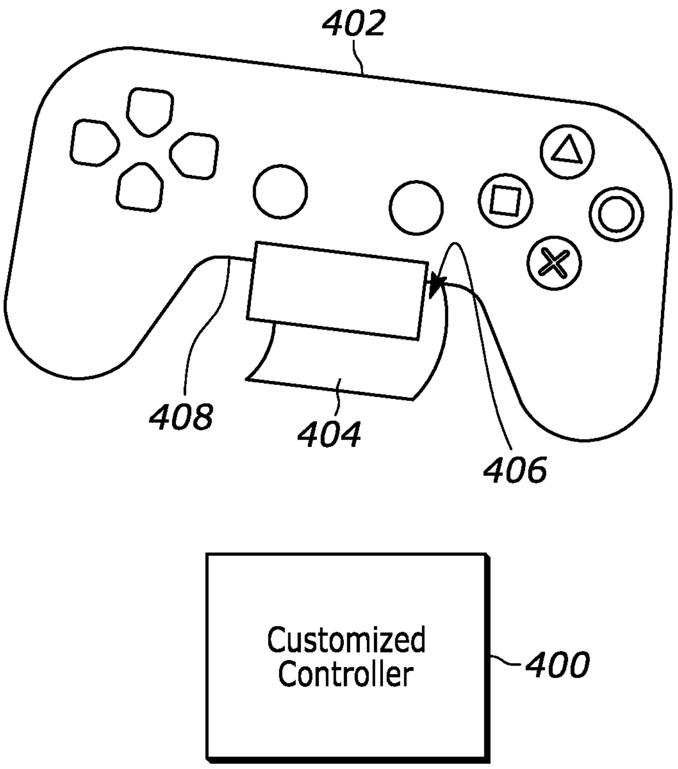
FIG. 4 illustrates the customized controller with an off-the-shelf controller resting in a holder.

FIG. 4 illustrates a customized controller 400 juxtaposed with an off-the-shelf computer simulation controller 402 such as a PlayStation® controller. The off-the-shelf computer simulation controller 402 is shown supported in a stand 404 that has an upper horizontal channel 406 configured to receive the lower edge 408 of the controller 402.

Figure 5:
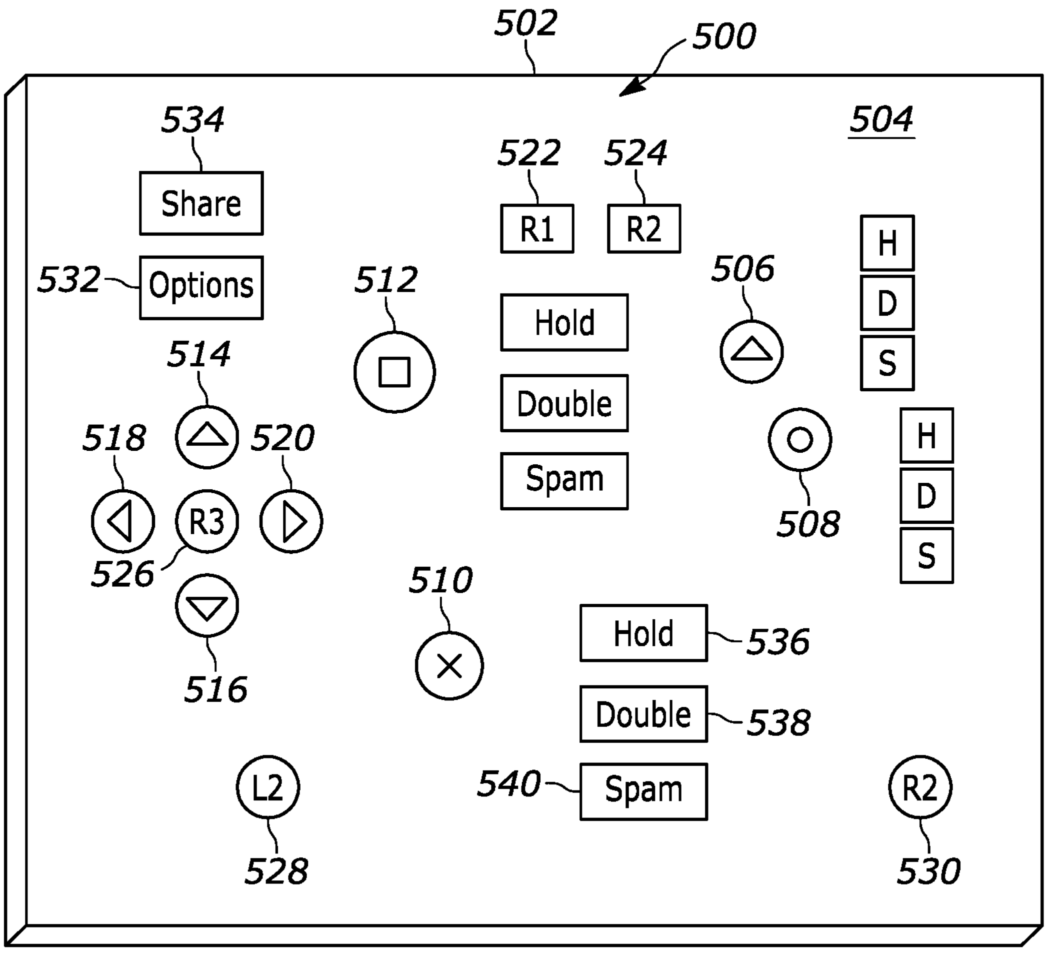
FIG. 5 illustrates an example button layout of an example customized controller.

FIG. 5 illustrates a customized controller 500 that has plural buttons matching the shapes and functions of the buttons of the off-the-shelf computer simulation controller 402 albeit remapped to sizes and locations that are tailored for a specific player. In the example shown, the controller 500 has a parallelepiped-shaped based 502 with a flat top surface 504 on which plural control buttons have been formed. The base 502 may have positions available in a grid pattern. The buttons may include one or more of the following buttons with the same functions they would otherwise have on a standard off-the-shelf PlayStation controller:

- Δ, ○, x, □ buttons 506, 508, 510, 512 which generate digital signals when manipulated to interact with game characters, cause characters to jump, cause characters to fire weapons, and other functions as may be dictated by a specific video game;
- up, down, left right navigational buttons 514, 516, 518, 520 ("D-pad") to navigate menus or cameras or character motions;
- R1, R2, and R3 buttons 522, 524, 526 which when manipulated generate digital signals to control characters and other game actions. L1, L2, L3, and R3 buttons also may be provided;
- L2, R2 sticks 528, 530 which when manipulated generate analog signals to aim and shoot weapons, control character movement, control virtual camera;
- OPTIONS and SHARE buttons 532, 534 to start and pause a simulation and share screen shots/dialogs, etc.

Additional standard buttons may be provided.

Further, special purpose anti-fatigue buttons may be provided on the customized controller 500 that are not necessarily provided on the standard off-the-shelf controller 402 that forms the basis for the control functions of the customized controller 500. For instance, a hold button 536 may be provided that may be touched once to cause a subsequent button that is manipulated after the hold button to be regarded by the MCU is being held down, even though the subsequent button is simply touched and released. In the example shown, the hold button applies only to an adjacent button such as the "X" button as shown, with multiple hold buttons being provided next to buttons to which they exclusively apply, it being understood that in other embodiments a single hold button may be provided to apply to any button that is immediately subsequently pressed and then to no longer apply the hold function unless and until the single hold button is once again depressed.

A double button 538 may be provided that may be touched once to cause a subsequent button that is manipulated after the hold button to be regarded by the MCU is being pressed twice in succession, even though the subsequent button is simply touched once. In the example shown, the double button applies only to an adjacent button such as the "X" button as shown, with multiple double buttons being provided next to buttons to which they exclusively apply, it being understood that in other embodiments a single double button may be provided to apply to any button that is immediately subsequently pressed and then to no longer apply the double press function unless and until the single double button is once again depressed.

One or more spam buttons 540 also may be provided as shown. The spam button is effectively a pulse width modulation (PWM) from 0-100 magnitude of alternating low to high signal. This acts as repeated button presses.

Figure 6:
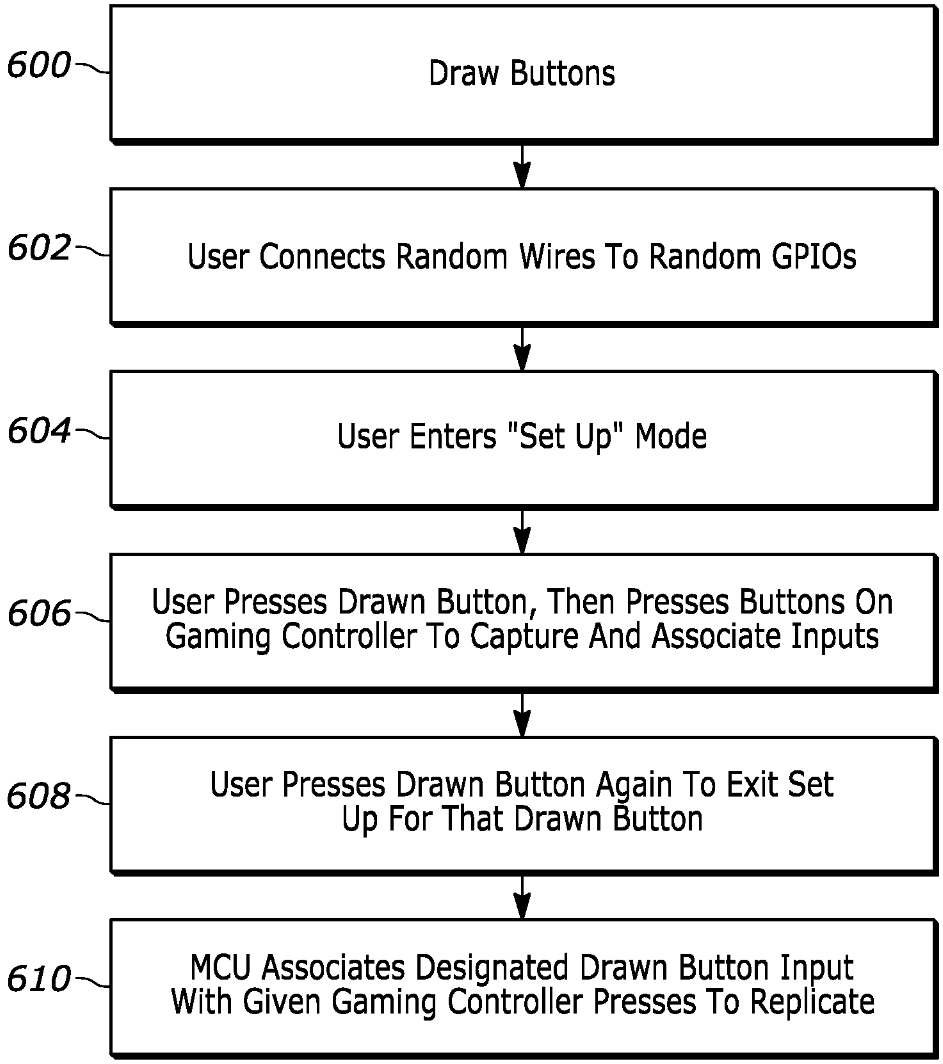
FIG. 6 illustrates example logic in example flow chart format consistent with present principles.
Figure 7:
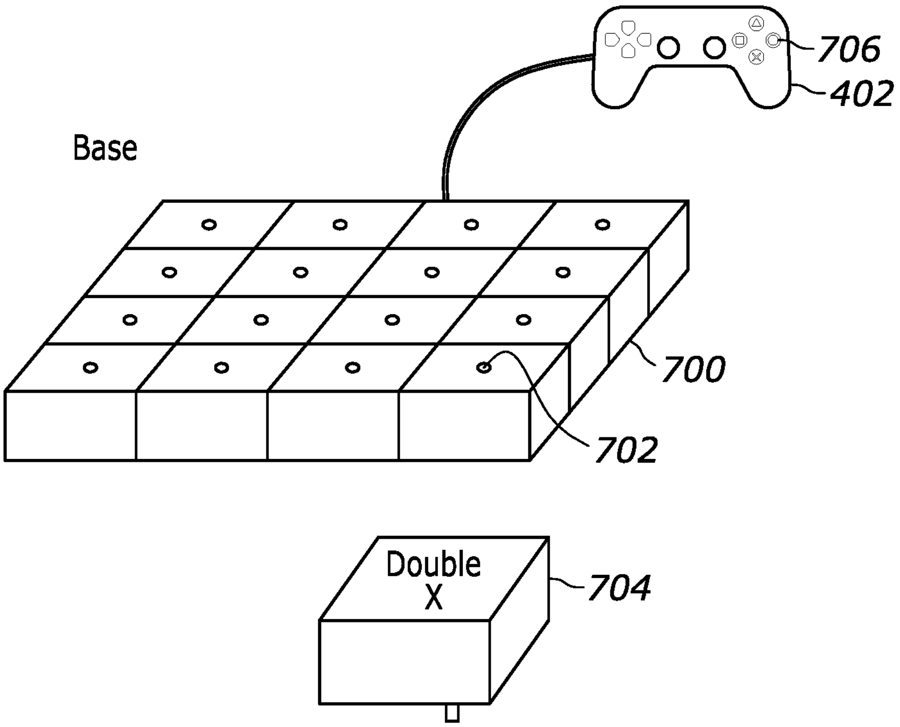
FIG. 7 illustrates an example set-up architecture.
Figure 8:
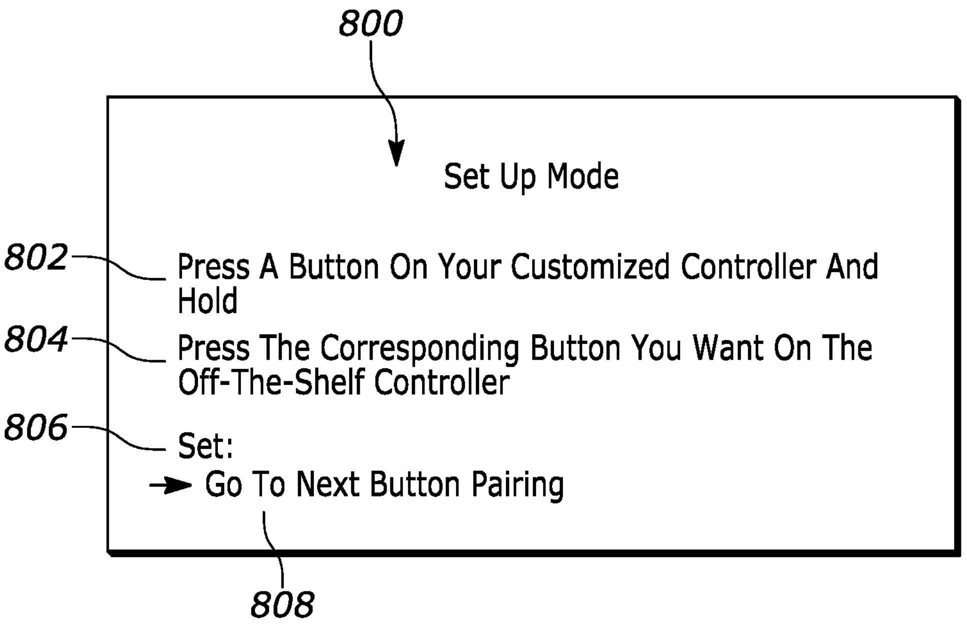
FIG. 8 illustrates an example screen shot of a user interface for set-up of the customized controller.

FIG. 6 illustrates a first example logic flow with cross-reference to FIGS. 7 and 8. Commencing at block 600, a player with a customized controller base 700 (FIG. 7) without any button yet formed on it may draw, e.g., using conductive ink, any of the buttons described herein on the top surface of the controller, in any layout, sizes, and shapes desired by the player. Wires 702 embedded in the base under the drawn buttons are then connected at block 602 to GPIO pins of the MCU such as the pins 210 of the MCU 208 shown in FIG. 2, in a random manner, i.e., without constraining the player to connect specific wires to respective specific pins. Note that in another embodiment, wires may not be embedded in the base 700, in which case, for each button the player connects a cable with a flat-faced alligator clip to the portion of the base on which the button is drawn and then plugs the other end of that cable into the MCU for each of the drawn buttons.

Proceeding to block 604, the player enters a set up mode in which at block 606 the player presses a first one of the drawn buttons on the base 700 and then presses the button on the standard off-the-shelf controller such as the controller 402 shown in FIG. 4 whose function the player wishes to have the currently pressed drawn button on the base 700 to acquire. To this end, it is to be understood that wired or wireless communication is established between the standard off-the-shelf controller and the MCU of the customized controller. The player then once again presses the button on the customized controller at block 608 to exit the set-up mode for that button, with the MCU associating the function of the pressed button on the standard off-the-shelf controller with the pressed button on the customized controller at block 610. The process is repeated for each button on the customized controller.

Note that for the special purpose anti-fatigue buttons such as the hold and double buttons, the player can press the drawn button on the customized controller and then hold (or double press as the case may be) the button on the standard off-the-shelf controller whose function on the customized controller the player wishes the anti-fatigue button function to apply to.

Thus, in FIG. 7 a double drawn button 704 (corresponding to the double button 538 in FIG. 5) is shown in an exploded view from the customized controller 700, in this case, drawn with the designation "X" to remind the player which adjacent button the double button is paired with. To establish which drawn button the player wants a press of the double button 704 to pair to, the player presses the corresponding button 706 on the standard off-the-shelf controller. A subsequent press of the corresponding button on the customized controller (in this example, the "X" button 510 in FIG. 5) pairs the X button on the customized controller with the double button 704, such that whenever the player presses the double button, a single press of the "X" button on the customized controller will be interpreted by the MCU as two presses in a row.

FIG. 8 illustrates a UI 800 that may be presented on any display herein to aid in the above-described set up mode. A prompt 802 may be presented to press a button on the customized controller and hold the button to enter set up. A second prompt 804 may be presented to press the desired corresponding button on the off-the-shelf controller to establish the functionality of the button the customized controller, and when the function is set as indicated at 806, the player is prompted at 808 to set the next button.

Figure 9:
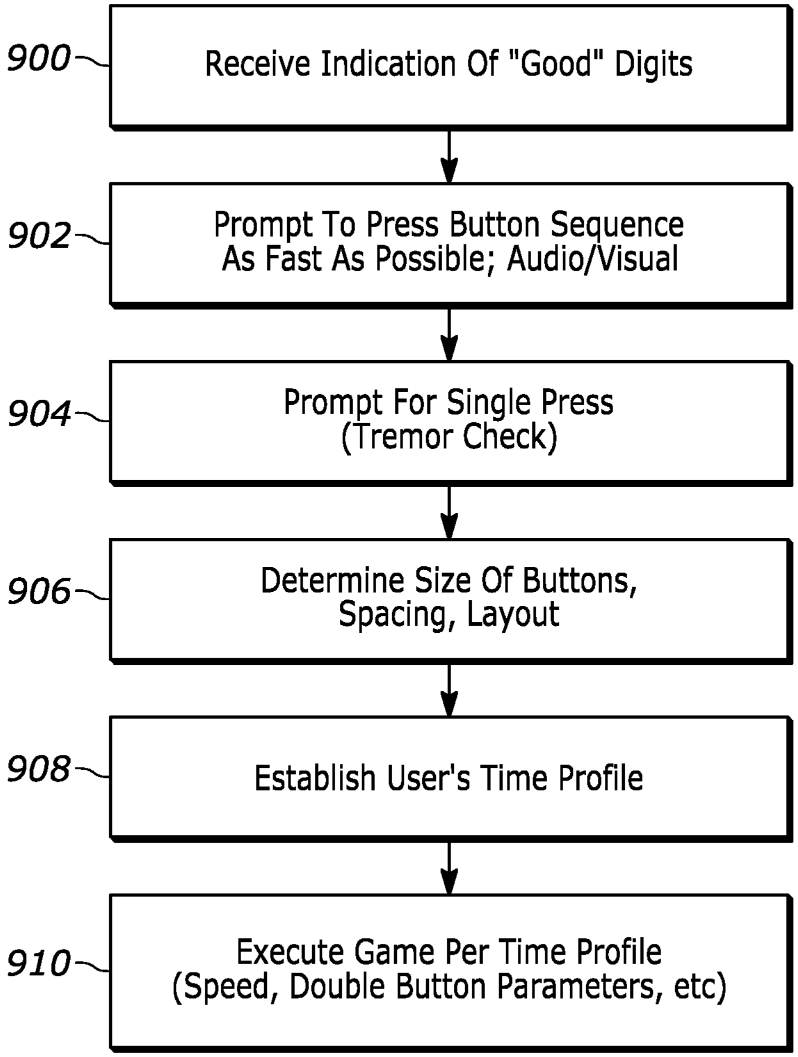
FIG. 9 illustrates additional example logic in example flow chart format consistent with present principles.

Turn now to FIG. 9 for a technique to establish adaptive/individualized profiles using a generative model that creates a customized template depending on which body parts a person can articulate, the person's range of motion; how quickly a person can move them, the person's ability to precisely input values, and which functions a standard controller can easily satisfy.

Figure 10:
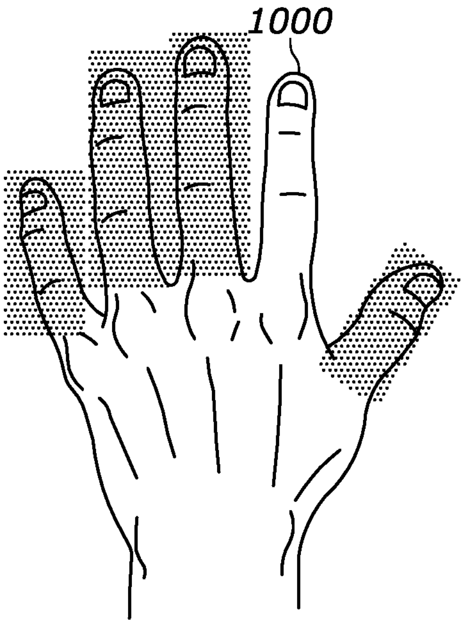
FIG. 10 illustrates human hands.

Commencing at block 900, indication of a player's manual ability is received. The indication may come from, e.g., a separate application executed by a smart phone, and may indicate responses by the player as to which digits the player can articulate. For example, FIG. 10 indicates that the player has indicated use of only the index finger 1000 of the left hand and use of all digits of the right hand except the index finger 1002.

Proceeding to block 902, the player may be prompted to press buttons, e.g., on a standard off-the-shelf controller, as quickly as possible to determine how quickly the player can articulate an arm, which can determine how far apart the buttons will be. Block 904 indicates that the player further may be prompted for a single press a button to determine if the player suffers any tremors, which can determine the size of the buttons. Tremors may be detected by a series of quickly spaced-apart signals from the button during the "single press".

Note that to better accommodate users with visual limitations, an audio speaker may be used to provide audible indication of the prompts and/or buttons that were pressed to confirm that the player has pressed the correct buttons.

Figure 11:
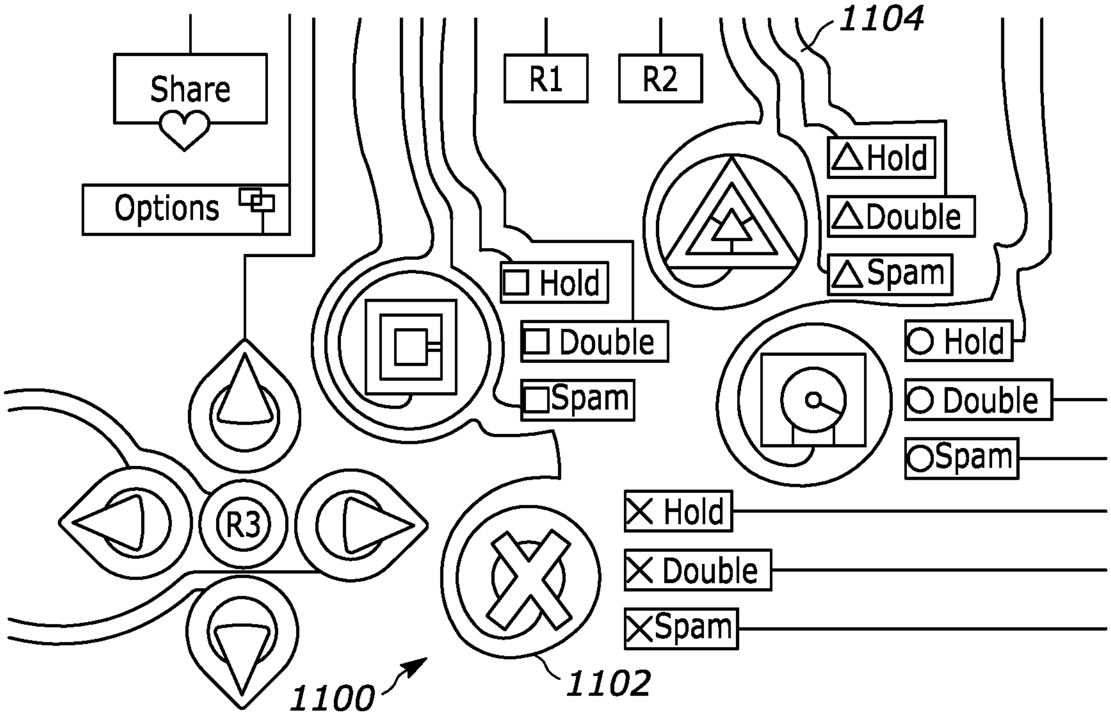
FIG. 11 illustrates the right side of an example customized controller tailored to the hands shown in FIG. 10.

Moving to block 906, based on the player's dexterity as indicated from blocks 900-904, the sizes of buttons, space between buttons, and layout of buttons may be determined, and a resulting customized controller made for the player and provided to the player. FIG. 11 illustrates a right side of a customized controller 1100 that, because the player was determined to have tremors at block 904, one or more buttons 1102 have relatively large sizes. Note the electrical conductors 1104 in FIG. 11 that are connected to respective buttons, drawn in conductive ink, and that as alluded to above are connected in turn to respective GPIOs of an MCU such as the GPIOs 210 of the MCU 208 shown in FIG. 2.

In generating the customized controller in FIG. 9, human engineers may design the controller based on player input, or machine learning (ML) may be employed. For this latter technique, a ML model may be trained on ground truth button sizes, spacings, and layouts (arrangements) accompanied by labels indicating dexterity issues associated with each design.

Additionally, a customized user profile may be generated by prompting the player at block 908 to press buttons as quickly as possible to determine a personalized time profile. The time profile is subsequently used at block 910 to play computer simulations at a speed and manner appropriate for the profile speed. For example, if a player cannot press a combination of X+O quickly enough to register for a combination move in a game, the custom profile for that player will cause the game engine to adjust the game parameters to accommodate the profile speed.

Adhesive buttons with tactile information (Braille, an embossed surface, etc.) can be included and if desired coated with conductive ink to work as capacitive buttons.

Note that the end user may attach wires from drawn buttons to GPIOs on the MCU, or the buttons may already be connected to the MCU and then delivered to the end user, with the MCU reading the standard off-the-shelf gaming controller button presses and associating them with respective buttons the player (end user) has drawn and is simultaneously pressing with the standard off-the-shelf gaming controller buttons.

Figure 12:
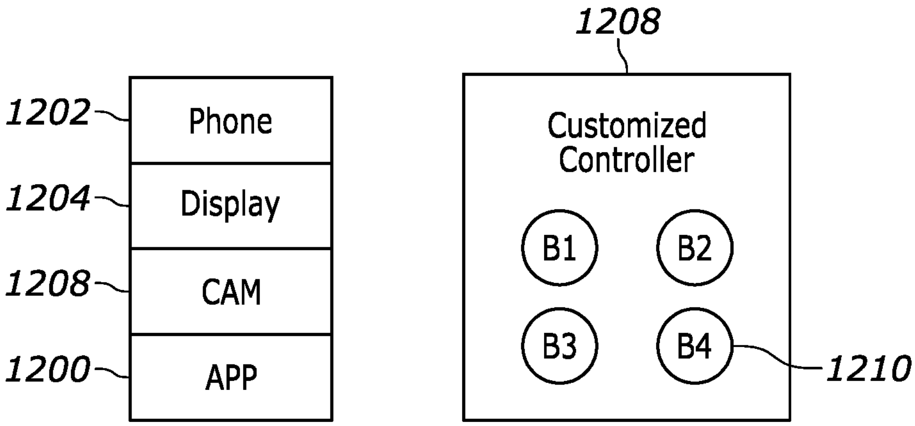
FIG. 12 illustrates an example system in which an auxiliary device, embodied for illustration as a smart phone, is used in conjunction with a customized controller.
Figure 13:
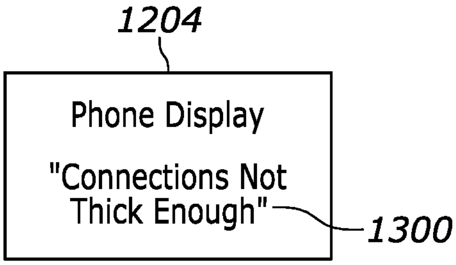
FIGS. 13 and 14 are screen shots of example UIs that can be presented on the auxiliary device shown in FIG. 12.
Figure 14:
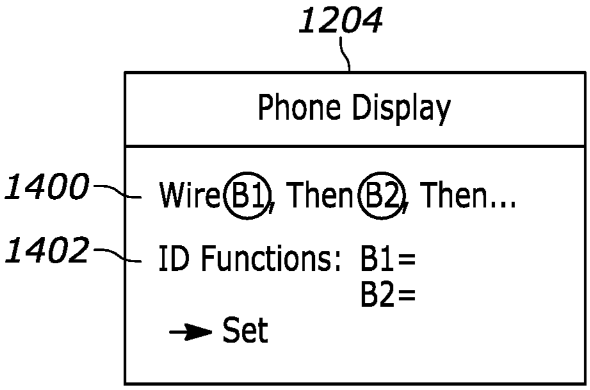

FIGS. 12-14 are screen shots illustrating additional features. Confirmation of correct set up can be provided by an app 1200 executed by an auxiliary device such as a phone 1202 with display 1204 for presenting a UI, and a camera 1206. The app analyzes connections on a hand-drawn customized template 1208 using images from the camera 1206, it being understood that the template 1208 may be any of the customized controllers described herein.

For example, the app can identify areas where the connection from the conductive ink may not be sufficiently thick, and as shown in FIG. 13 provide an advisory 1300 of such on the display 1204. The app may do this based on images from a camera of the conductive ink.

An additional application can take a picture of the customized controller 1208 and identify individual button 1210. As shown in FIG. 14, the app may prompt (1400) the player to wire the buttons to the MCU's GPIO header in a designated order and to identify (1402) the preferred function on the game controller. The app sends the associations to the MCU.

Substrates for the base of the customized controllers described herein can include conductive ink or paint on paper, ceramics, glass, metal, dry wall, wood, acrylic, etc. Provided that wires can attach from the buttons to an MCU that can receive them as inputs, the form factor is open to interpretation. A 3D-printed mold of the user's hand or a wall can be used as a mapping.

Present principles apply to a foot-based controller, such as DualSense rendition of DDR.

While the particular embodiments are herein shown and described in detail, it is to be understood that the subject matter which is encompassed by the present invention is limited only by the claims.

What is claimed is:

1. A computer-implemented method comprising:

providing a prompt for a player to interact with a controller for a video game system, wherein the prompt instructs the player to press and hold a button;

receiving data representing interactions of the player with the controller in response to the prompt, wherein the interactions of the player with the controller include the player pressing and holding the button;

determining, using the received data, a characterization of a dexterity of the player, the characterization of the dexterity of the player including a presence or absence of a tremor, wherein presence of the tremor is determined based on receiving a series of rapid signals from the controller while the player is pressing and holding the button;

providing a representation of the characterization of the dexterity of the player to a generative model that is trained to generate designs for custom controllers for players based on ground truth data that includes (i) different designs for custom controllers and (i) one or more respective labels for each different design that indicates one or more characterizations of dexterity;

receiving a particular design for a custom controller from the generative model; and associating the particular design with the player.

2. The method of claim 1, wherein the ground truth data associates different button sizes with different characterizations of dexterity.

3. The method of claim 1, comprising training the generative model using the ground truth data.

4. The method of claim 1, wherein the ground truth data associates different button spacings with different characterizations of dexterity.

5. The method of claim 1, wherein the ground truth data associates different controller layouts with different characterizations of dexterity.

6. A non-transitory computer-readable medium storing instructions which, when executed, cause a computer processor to perform operations comprising:

providing a prompt for a player to interact with a controller for a video game system, wherein the prompt instructs the player to press and hold a button;

receiving data representing interactions of the player with the controller in response to the prompt, wherein the interactions of the player with the controller include the player pressing and holding the button;

determining, using the received data, a characterization of a dexterity of the player, the characterization of the dexterity of the player including a presence or absence of a tremor, wherein presence of the tremor is determined based on receiving a series of rapid signals from the controller while the player is pressing and holding the button;

providing a representation of the characterization of the dexterity of the player to a generative model that is trained to generate designs for custom controllers for players based on ground truth data that includes (i) different designs for custom controllers and (i) one or more respective labels for each different design that indicates one or more characterizations of dexterity;

receiving a particular design for a custom controller from the generative model; and associating the particular design with the player.

7. The medium of claim 6, wherein the ground truth data associates different button sizes with different characterizations of dexterity.

8. The medium of claim 6, wherein the operations comprise training the generative model using the ground truth data.

9. The medium of claim 6, wherein the ground truth data associates different button spacings with different characterizations of dexterity.

10. The medium of claim 6, wherein the ground truth data associates different controller layouts with different characterizations of dexterity.

11. A system comprising:

a computer processor; and a non-transitory computer-readable medium storing instructions which, when executed, cause a computer processor to perform operations comprising:

providing a prompt for a player to interact with a controller for a video game system, wherein the prompt instructs the player to press and hold a button;

receiving data representing interactions of the player with the controller in response to the prompt, wherein the interactions of the player with the controller include the player pressing and holding the button;

determining, using the received data, a characterization of a dexterity of the player, the characterization of the dexterity of the player including a presence or absence of a tremor, wherein presence of the tremor is determined based on receiving a series of rapid signals from the controller while the player is pressing and holding the button;

providing a representation of the characterization of the dexterity of the player to a generative model that is trained to generate designs for custom controllers for players based on ground truth data that includes (i) different designs for custom controllers and (i) one or more respective labels for each different design that indicates one or more characterizations of dexterity;

receiving a particular design for a custom controller from the generative model; and associating the particular design with the player.

12. The system of claim 11, wherein the ground truth data associates different button sizes with different characterizations of dexterity.

13. The system of claim 11, wherein the operations comprise training the generative model using the ground truth data.

14. The system of claim 11, wherein the ground truth data associates different button spacings with different characterizations of dexterity.

* * * * *